United States Patent
Meldrum et al.

(10) Patent No.: US 6,867,767 B2
(45) Date of Patent: Mar. 15, 2005

(54) COMPUTER GRAPHICS APPARATUS

(75) Inventors: Simon David Meldrum, London (GB); Adam Michael Billyard, Guildford (GB)

(73) Assignee: Canon Kabushiki Kaisha, Tokyo (JP)

( * ) Notice: Subject to any disclaimer, the term of this patent is extended or adjusted under 35 U.S.C. 154(b) by 320 days.

(21) Appl. No.: 09/946,341

(22) Filed: Sep. 6, 2001

(65) Prior Publication Data

US 2002/0036663 A1 Mar. 28, 2002

(30) Foreign Application Priority Data

Sep. 6, 2000 (GB) .............................................. 0021906

(51) Int. Cl.$^7$ .............................................. G06T 15/00
(52) U.S. Cl. ...................................... 345/419; 382/154
(58) Field of Search ................................ 345/419, 418, 345/473, 474, 475; 382/154, 128; 348/14.01, 14.14, 154, 155

(56) References Cited

U.S. PATENT DOCUMENTS

| | | | |
|---|---|---|---|
| 50,988 A | * 11/1865 | Petrov et al. ................ | 24/108 |
| 5,563,989 A | 10/1996 | Billyard ....................... | 395/126 |
| 5,579,454 A | 11/1996 | Billyard et al. ............. | 395/121 |
| 5,631,974 A | 5/1997 | Lau-Kee et al. ............ | 382/132 |
| 5,740,801 A | 4/1998 | Branson .................... | 128/653.1 |
| 5,757,321 A | 5/1998 | Billyard ...................... | 345/434 |
| 5,777,620 A | 7/1998 | Billyard ...................... | 345/426 |
| 6,496,601 B1 | * 12/2002 | Migdal et al. ............... | 382/239 |
| 2001/0056308 A1 | 12/2001 | Petrov et al. ................ | 700/98 |

FOREIGN PATENT DOCUMENTS

EP      0 983 782 A2     3/2000

OTHER PUBLICATIONS

U.S. Appl. No. 09/511,387, filed Feb. 23, 2000.
U.S. Appl. No. 09/411,389, filed Oct. 4, 1999.
U.S. Appl. No. 09/511,361, filed Feb. 23, 2000.
U.S. Appl. No. 09/512,354, filed Feb. 24, 2000.
U.S. Appl. No. 09/513,471, filed Feb. 25, 2000.
U.S. Appl. No. 09/631,707, filed Aug. 3, 2000.

* cited by examiner

Primary Examiner—Don Wong
Assistant Examiner—Huedung X. Cao
(74) Attorney, Agent, or Firm—Fitzpatrick, Cella, Harper & Scinto (57) ABSTRACT

There is described a computer graphics apparatus having a data store for storing data defining a computer model comprising a plurality of three-dimensional objects, the computer model varying over time. The computer graphics apparatus processes the data defining the computer model to generate display data defining a sequence of two-dimensional display images, which change as the computer model varies over time, for display to a user. The computer graphics apparatus is also able to generate static image data corresponding to a displayed image in response to an initiation signal. In order to ensure that the static image data corresponds to the displayed image on receipt of the initiation signal, the computer apparatus is arranged to detect modification of the computer model subsequent to the reception of the initiation signal and to store recovery data enabling the computer model corresponding to the display image on receipt of the initiation signal to be generated using the computer model as modified subsequent to the reception of the initiation signal.

31 Claims, 8 Drawing Sheets

COMPUTER GRAPHICS APPARATUS

This invention concerns computer graphics apparatus, and is particularly concerned with graphics apparatus which processes a three-dimensional computer model in order to generate two-dimensional static image data alongside two-dimensional dynamic image data for an image display unit. The static image data may, for example, be print data for a printer or display data for an image display unit.

A standard personal computer has a keyboard key labelled "PrintScreen" or the like. If a user presses this key, a signal is sent from the keyboard to the personal computer which initiates the generation of a printed image corresponding to the image displayed on the screen of the personal computer at the time the key is pressed.

For many applications, changes to the display image are infrequent and the printed image can be generated using the same data as used for the display image. However, for applications in which image data for the display image is generated by processing a three-dimensional computer model, for example some games and multi-media applications, the display image may be highly dynamic.

For these applications, the rate at which the display image is updated, generally called the frame rate, is frequently many times a second in order to prevent a jerky image being displayed to the user. In order to achieve this frame rate, the resolution of the display image often has to be reduced because there is insufficient time to generate a display image with a higher resolution. However, this reduction in resolution in a particular frame is typically imperceptible to the user viewing the display because the high frame rate gives the user an overall impression of high resolution.

Since each individual frame of a highly dynamic image may comprise relatively low resolution data, such data does not produce an acceptable printed image. Moreover, it is common for displays to have output resolution in the order of one thousand pixels in each direction. Since a printer may have a resolution of, for example, 12 dots per mm, mapping one pixel of the display image to one printer dot would result in a very small printed image. Increasing the number of printer dots to which each pixel is mapped yields printed results of progressively lower quality.

Further, the low resolution image data of the dynamic display image does not produce acceptable static images for electronic storage and subsequent display to a user because the low resolution is perceptible to a user.

According to an aspect of the invention, in response to a static image initiation signal, static image data is generated by processing the computer model in a separate operation to the generation of dynamic image data for the display of a sequence of images. Preferably, as the computer model changes subsequent to the reception of the initiation signal, data is stored which enables the computer model when the initiation signal was received to be recovered using the changed computer model.

Storing "recovery" data in this way has the advantage that the computer model is allowed to change dynamically during the time required to generate the static image data, thereby reducing any undesirable pause in the displayed sequence of images, while still enabling the static image data to maintain fidelity with the display image at the time the initiation signal was received.

In addition, storing only recovery data associated with changes to the computer model avoids the need to copy the entire computer model at the particular time the initiation signal is received for generation of the static image data.

This is advantageous because storing the entire computer model requires the use of a large amount of memory, which is particularly undesirable because the generation of the static image data also requires the use of a large amount of memory.

In an embodiment, when the computer graphics apparatus detects a modification to a part of the computer model, the part of the computer model to be modified is stored unchanged as the recovery data prior to the modification taking place. In another embodiment, when the computer graphics apparatus detects a modification to the computer model, change data associated with the difference between the computer model before and after modification is generated and stored as the recovery data.

In an embodiment, the computer graphics apparatus comprises a plurality of instruction generators for modifying the computer model, and each instruction generator commences a modification by generating a lock instruction which prevents other instruction generators from performing other modifications at the same time which may lead to errors occurring. This lock instruction can be applied to all or only part of the computer model, and can also be used by the computer graphics apparatus to detect when a modification occurs.

Another aspect of the invention provides a method of generating static image data corresponding to one of a sequence of display images generated from a variable three-dimensional computer model, comprising receiving a signal operable to initiate generation of the static image data, detecting modification of the computer model subsequent to reception of the initiation signal and, in response to detection of a modification, storing recovery data enabling the computer model corresponding to the display image on receipt of the initiation signal to be generated using the computer model as modified subsequent to reception of the initiation signal. Static image data corresponding to the display image on receipt of the initiation signal is then generated using the computer model as modified subsequent to reception of the initiation signal and the recovery data.

Embodiments of the invention will now be described, by way of example only, with reference to the accompanying drawings, in which.

As described below, in an embodiment of the invention a computer graphics apparatus stores a computer model of a three-dimensional scene which varies in accordance with computer-generated instructions (generated in response to user input signals as a computer game is played in the described embodiment). The computer graphics apparatus repeatedly processes the computer model to generate image data for a display image on a screen, thereby producing a sequence of images which vary in accordance with the variation of the computer model. A user is able to select a display image for printing by pressing a key on a keyboard. Thereafter, if any modification of the computer model is made subsequent to the selection of the display image but before print data corresponding to the selected display image has been generated, then "recovery" data is stored which enables the computer model corresponding to the selected display image to be regenerated using the computer model as modified subsequent to the display image selection. In this way, the print data corresponding to the selected display image is generated using the current computer model as modified subsequent to the display image selection and the stored recovery data.

Figure 1:
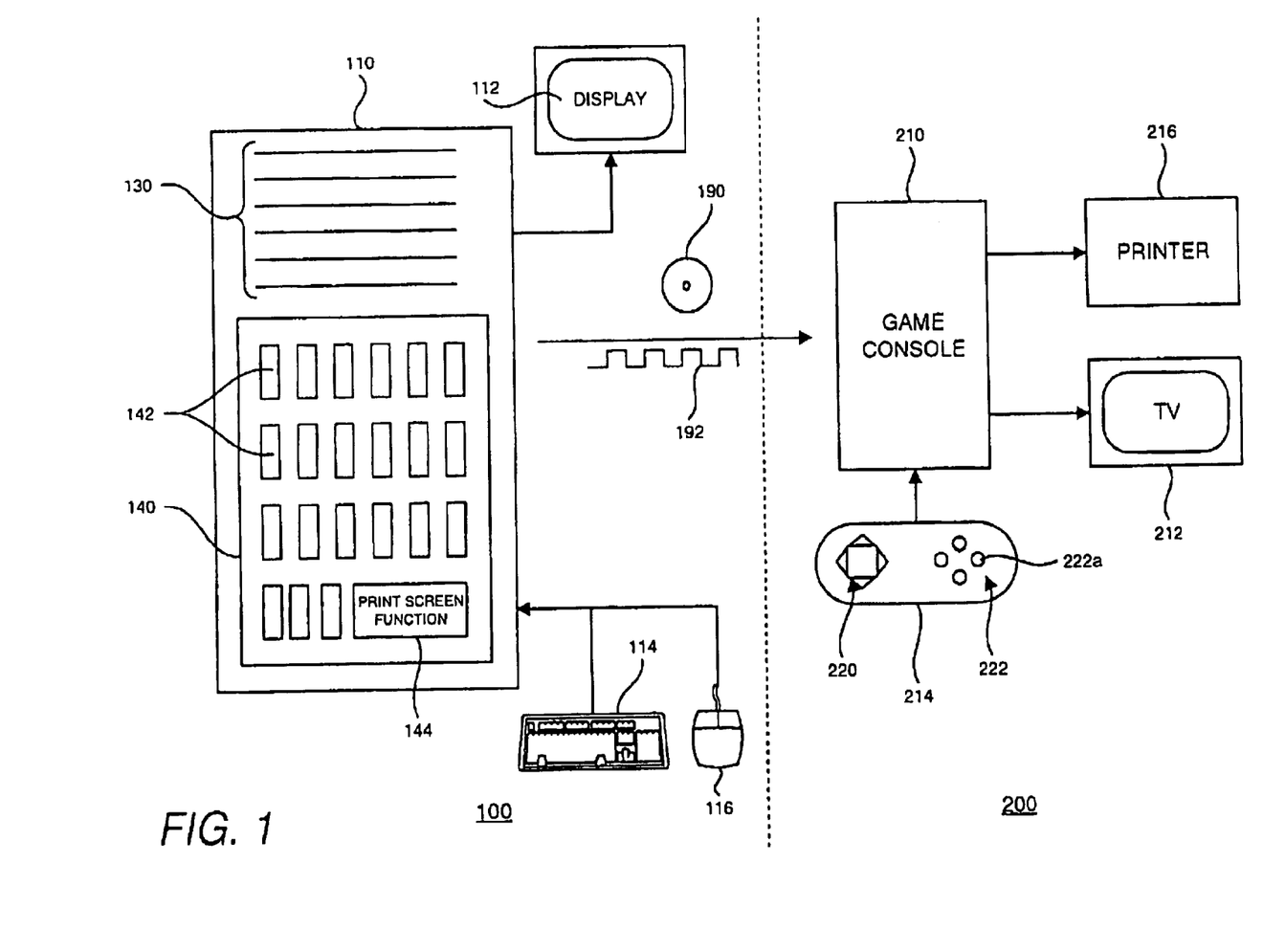
FIG. 1 is a schematic diagram showing development of a computer program product and delivery thereof to an entertainment system.

Referring to FIG. 1, a software development apparatus 100 is operable to produce a computer program product, for delivery to a home entertainments apparatus 200. Delivery can be by means of a storage medium such as an optical disk 190, or conveyed on a signal 192, for instance via the Internet.

The software development apparatus 100 comprises a personal computer 110 connected with a display 112, a keyboard 114 and a mouse 116. The computer program product is developed on the personal computer 110, by means of developer input on the keyboard 114 and mouse 116, as lines of text 130 known as source code. The source code 130 utilises a graphics library 140 including a plurality of functions 142, which can be referred to in the source code 130. Each function 142 comprises a section of code which can be incorporated into the final software product. Use of a predefined library is a convenient way of providing an interface between a relatively high level program, such as the source code 130 and low level activities such as hardware control. In the case of the graphics library 140, the hardware control in question is the control of hardware to generate display data for graphical representation to a user.

Further comprised in the graphics library 140 is a printscreen function 144. This comprises machine code instructions as before, but operable to cause the computer apparatus on which the program is running to be responsive to a particular user input action to generate a printed document corresponding to the image displayed on the apparatus at the time the user makes the input.

A computer program product generated on the development apparatus 100, whether delivered on the optical disk 190 or by the signal 192, resides on the game console 210 of the home entertainments apparatus 200.

The game console 210 is connected to a television 212, a handset 214 and a printer 216. The handset 214 comprises a set of direction keys 220 and a set of auxiliary keys 222. Of those keys, the computer program product is made responsive to a particular key 222a to activate the printing of a representation of the displayed image at the time that the key 222a is pressed. This originates from the incorporation of the printscreen function 144 into the computer program product.

Figure 2:
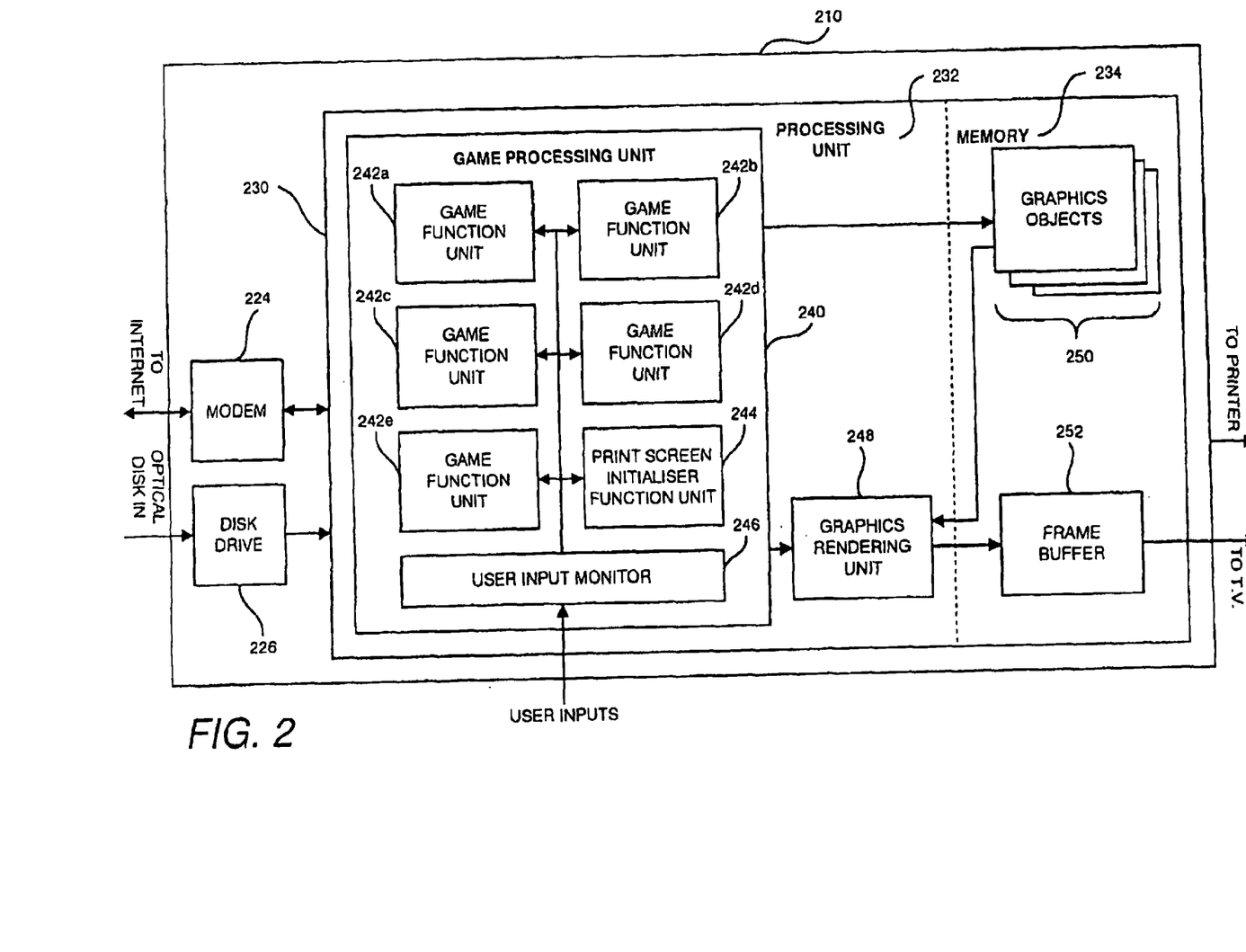
FIG. 2 is a schematic diagram of a game console illustrated in FIG. 1 having the computer program product installed therein.

The games console will now be described in more detail with reference to FIG. 2.

The games console 210 comprises a modem 224 to receive, for instance, the signal conveying the computer program product previously described, and a disk drive 226 to receive the optical disk 190. A computer unit 230 of the console comprises a processing unit 232 and memory 234. This is a schematic division of the operation of the computing unit 230, which delineates between processing parts of the computing unit 230 configured by the computer program product, and data storage parts thereof. The computer program product instances a game processing unit 240 on the computing unit 230. The game processing unit 240 reads, stores and updates a series of graphics objects 250 in memory. The graphics objects form a computer model defining a three dimensional scene, within which the game is to be performed. The graphics objects are processed, in an operation commonly termed rendering, to produce two-dimensional image data representative of a view of the three-dimensional scene. In particular, the game processing unit sends data from the graphics object 250 to a graphics rendering unit 248, which converts the objects into rasterised data stored in a frame buffer 252, for display on the television 212.

The game processing unit 240 monitors user inputs, by means of a user input monitor 246. These user inputs are interpreted thereby, and are passed to game function units 242a to 242e, which make reference to the graphics objects 250 and make changes thereto as appropriate in response to the user inputs. Further, a printscreen initialiser function unit 244 is responsive to a user input corresponding with the user pressing key 222a illustrated in FIG. 1.

Figure 7:
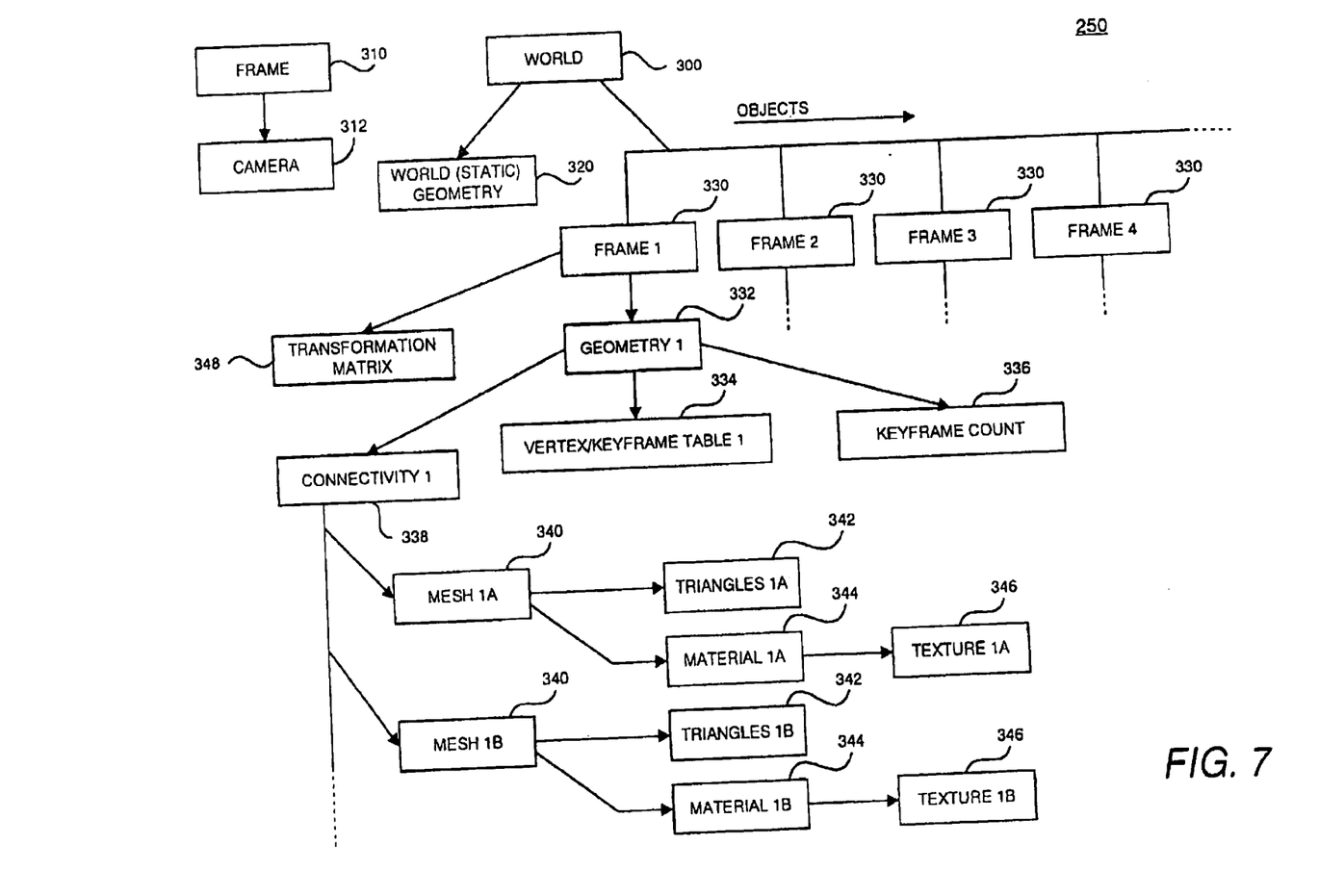
FIG. 7 is a schematic diagram showing an arrangement of objects in memory for defining a scene to be graphically represented and of which a printed document is generated by the console in FIG. 3.

FIG. 7 shows the graphics objects 250 for a three dimensional scene, using the operation of the game embodied by the game processing unit 240, a representation of which is to be generated on the television 212 and/or the printer 216.

The graphics objects 250 are structured as a tree, at the head of which is a world object 300. This comprises a series of pointers to a world geometry object 320, comprising a description of static geometry in the world and dynamic objects represented by frame objects 330. Each frame object 330 comprises a representation of the position and orientation of a graphics object. Within that frame object is a pointer to a transformation matrix 348, which determines the location of the graphic object within the static world geometry, and a pointer to a geometry object 332, which itself includes a pointer into vertex/keyframe table 334, and a keyframe counter 336.

Further, the geometry object 332 points to a connectivity object 338, which comprises a list of meshes 340. Each mesh points to a series of triangles 342, a material object 344 to be used with the triangles 342, and a texture 346 to be superimposed over the material 344. This arrangement of objects allows amendment of the scene by means of amendment of a particular object. The geometry object 332 for a particular frame 330 describes vertices in a coordinate system defined in the frame object 330.

In order to allow for modification of geometry over time, the vertex/keyframe table 334 and keyframe counter 336 may be used for some of the dynamic objects to implement an interpolative animation technique. In particular, the vertex/keyframe table 334 contains different combinations of coordinates of the vertices for given moments in time, and the co-ordinates of the vertices at times between the given moments are determined by an interpolation technique, with the keyframe counter 336 being used to keep track of the passing time. In this way, a particular representation of a dynamic object can be defined by the contents of the vertex/keyframe table 334 and the keyframe counter 336.

The connectivity object 338 describes how groups of polygons of the object fit together. The object may be composed of a number of sub-objects, each of which is described in a mesh 340. This mesh comprises a series of triangles 342, which share the same material properties, and the texture 346. The texture 346 may change over time, by means of another function 242a to 242e of the game processing unit 240.

In order to view the scene defined in the world object 300 and objects depending from the world object 300, a camera object 312 is defined in the scene by means of a frame 310, comprising position and directional coordinates of the camera 312. The frame object 310 and camera object 312 may be changed, in response to user input, by other functions 242a to 242e of the game processing unit 240.

Thus, it can be seen that several of the objects, including the transformation matrices 348, the keyframe counter 336 and the textures 346, may be changed frequently by the game processing unit 240.

Figure 3:
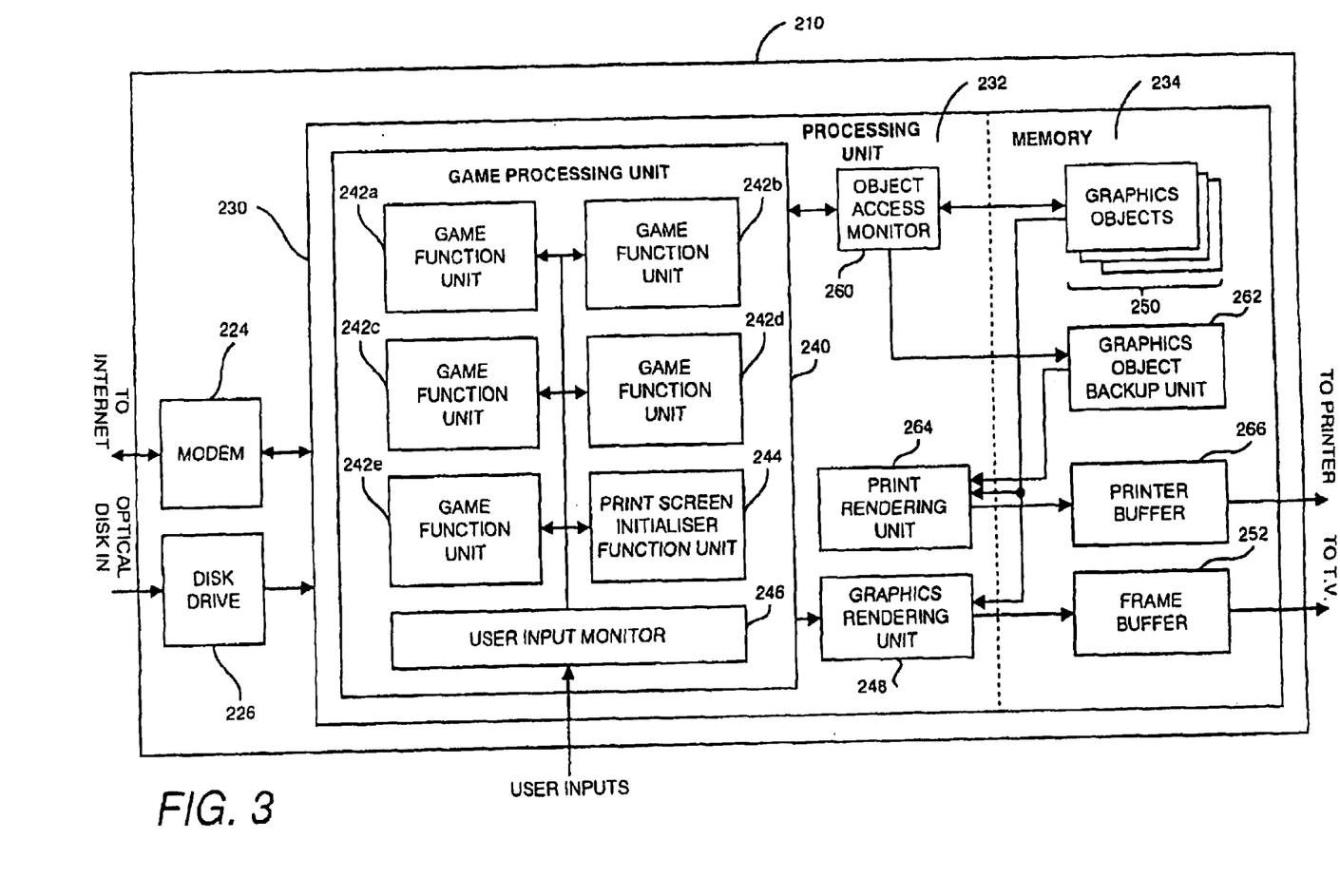
FIG. 3 is a schematic diagram of the game console illustrated in FIG. 2, with a screen printing function of the computer program product activated.
Figure 4:
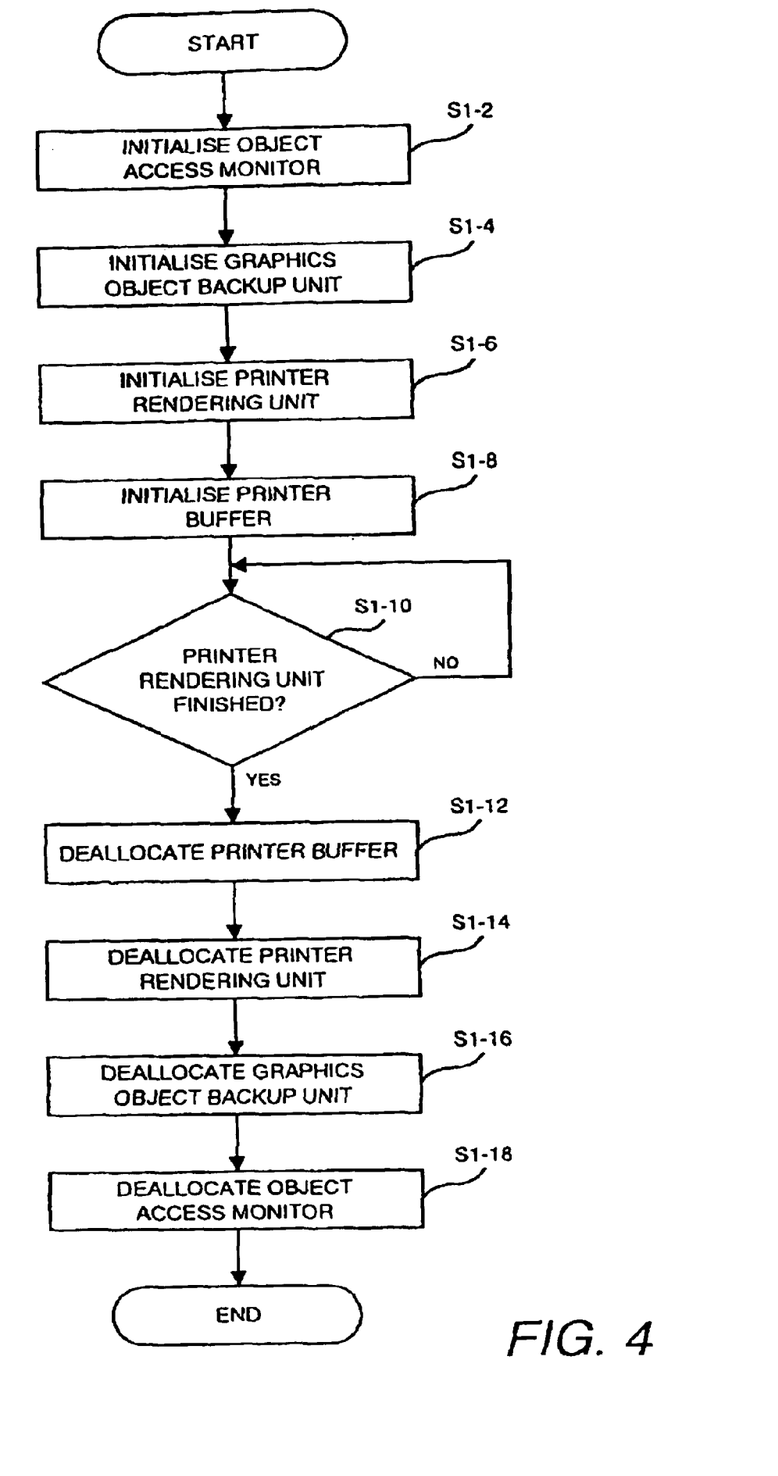
FIG. 4 is a flow diagram illustrating a process performed by a printscreen initialiser function unit of the computer program product on the game console of FIGS. 2 and 3.

The operation of the printscreen initialiser function unit 244 on receipt of its corresponding user input will now be described with reference to FIG. 3, which shows how the printscreen initialiser function unit 244 configures the computing unit 230, and FIG. 4, which shows the processing steps performed by the printscreen initialiser function unit 244.

Firstly, in step S1-2, an object access monitor 260 is initialised, to monitor the access of graphics objects 250 by function units 242a to 242e in the game processing unit 240. The object access monitor 260 can detect when a graphics object 250 is likely to be changed by the game processing unit 240, because in this embodiment each function 242a to 242e must, before it makes a change to a graphic object 250, lock that object 250 so that it cannot be accessed by any other function 242a to 242e. This prevents two functions attempting to write information to a graphics object 250 simultaneously. Therefore, in this embodiment, the object access monitor 260 monitors requests sent by the game processing unit 240 to lock a graphic object 250.

The printscreen initialiser function unit 244 then initialises, in step S1-4, a graphics object backup unit 262. This is operable, when the object access monitor 260 detects an object lock request, to make a copy of the object 250 to which the object lock request refers, before that object 250 is changed by the function 242a to 242e.

Figure 5:
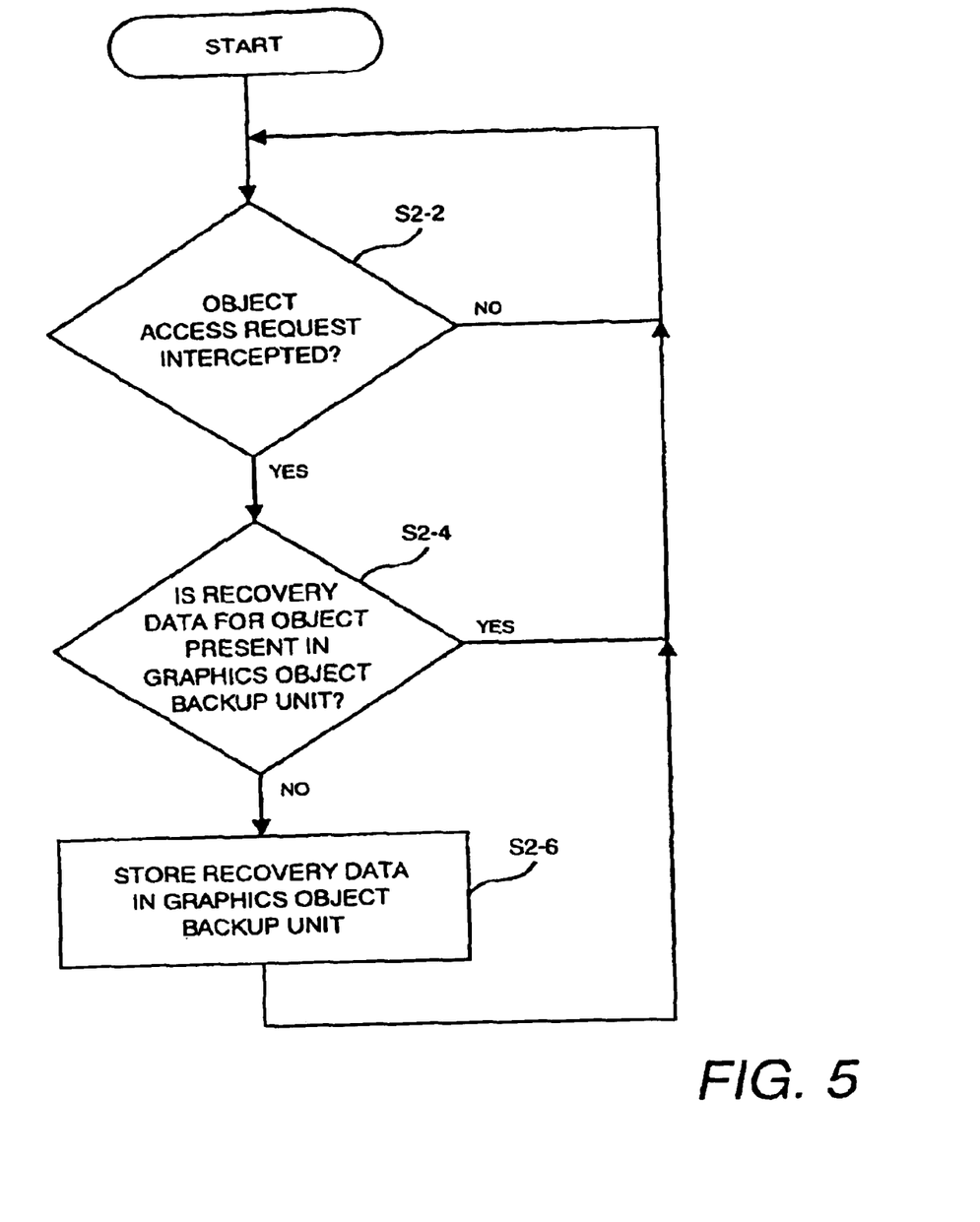
FIG. 5 is a flow diagram illustrating a process performed by an object access monitor on the game console illustrated in FIG. 3.

FIG. 5 shows the operation of the object access monitor 260 in this embodiment in further detail.

Referring to FIG. 5, firstly, in step S2-2, the object access monitor 260 monitors for an object access request, in which one of the functions 242a to 242e sends a request to a graphic object 250 for it to be locked against access by any other function 242a to 242e. This step cycles until an object access request has been intercepted when, in step S2-4, a check is made as to whether recovery data for the object to which the object access request relates is presently stored in the graphics object backup unit 262. In this embodiment, the recovery data comprises a copy of the object. If recovery data is already present in the graphics object backup unit 262, the object has already been accessed, and probably amended, since the PrintScreen initialiser function unit initiated the PrintScreen operation. Thus, another copy of the object is not required, and would lead to the amended object being rendered instead of the original object. Thus, the process returns to step S2-2, to monitor for the next object access request.

On the other hand, if it is determined at step S2-4, that a copy of the object in question is not present in the graphics object backup unit 262, then, in step S2-6, a copy of the object is stored as the recovery data in the graphics object backup unit 262. Once a copy has been made, the process returns to step S2-2, to monitor for the next object access request. This process continues until the object access monitor 260 is deallocated by the printscreen initialiser function unit 244.

Figure 8:
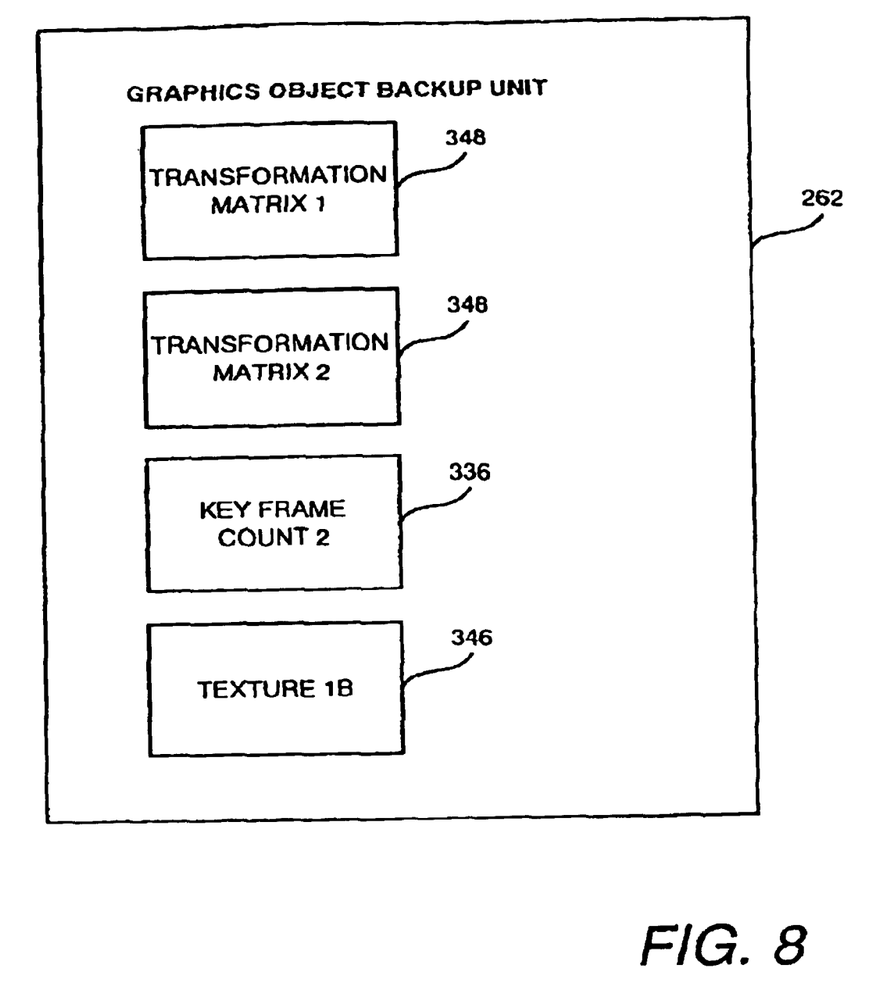
FIG. 8 is a schematic diagram showing the contents of a graphics object backup unit on the console of FIG. 3, in operation of the processes of FIGS. 4, 5 and 6.

FIG. 8 shows an example in which the graphics object backup unit stores a copy of transformation matrix 1 and transformation matrix 2 objects 348 illustrated in FIG. 7, together with a keyframe counter object 336 for frame 2, and a texture 1B object 346 as recovery data. This example implies that, since the user requested a print screen function, the game processing unit has moved the three dimensional object represented by frame 1 and depending objects, has moved the three dimensional object corresponding with frame 2, and has also modified the three dimensional object represented by frame 2 so as to place the vertices thereof in a different position as defined in the corresponding keyframe table, by changing the keyframe count of that object. Further, one of the textures incorporated into the display of the three dimensional object corresponding with frame 1, namely texture 1B, has been changed. Therefore, copies of those objects prior to those changes are stored in the graphics object backup unit. These will be used in preference to the modified contents of the objects in the rendering of the scene in the printer rendering unit 264.

In this embodiment, the texture objects 246 store a pointer to a stored bitmap. In order to reduce the access times of these bitmaps, the computer unit copies bitmaps which are likely to be required to a cache memory. Assigned to each bitmap in the cache memory is a reference counter which stores a count value indicating whether or not the associated bitmap is still needed. In particular, when a count value reaches zero the computer unit 230 is free to write data over the associated bitmap. In this embodiment, at step S2-6 (FIG. 5) when the object access monitor stores a texture object in the graphics object backup unit 262, the object access monitor also increments the count value of the associated bitmap by one and then, after the image has been printed, decrements the counter by one. This ensures that the bitmap is retained in the cache memory until the image is printed, even if the bitmap is no longer needed to generate image data for display to the user on TV 212, thereby reducing the amount of time required to produce the printed image.

Referring again to FIG. 5, if a new dynamic object is created after initialisation of the printscreen function, then recovery data is stored in the graphics object backup unit 262 indicating that the frame object 330 for the new dynamic object should be ignored by the print rendering unit 264. Further, if a dynamic object is removed from the current computer model after the initialisation of the printscreen function, then the entire frame object 330, including depending objects, for that dynamic object is stored as recovery data in the graphics object backup unit 262. Thus, if the computer model is modified to display an explosion in which an original dynamic object is separated into several new dynamic objects, then the recovery data stored in the graphics object backup unit 262 is the entire frame object 330 for the original dynamic object and data indicating that the frame objects 330 for the new dynamic objects should be ignored by the print rendering unit 264.

Returning to FIG. 4, after the graphics object backup unit has been initialised, the print screen initialiser function unit 244 initialises, in step S1-6, a printer rendering unit 264, following which, in step S1-8, it initialises a printer buffer 266.

The printer rendering unit 264 is largely a replica of the graphics rendering unit 248. However, it is configured to render in accordance with the process illustrated in FIG. 6. The printer rendering unit 264 traverses the graphics objects 250 in order to generate a graphical image. Firstly, in step S3-2, an enquiry is made as to whether the printer rendering unit 264 has received an object from the graphics objects 250. If not, the process cycles until an object is received.

Figure 6:
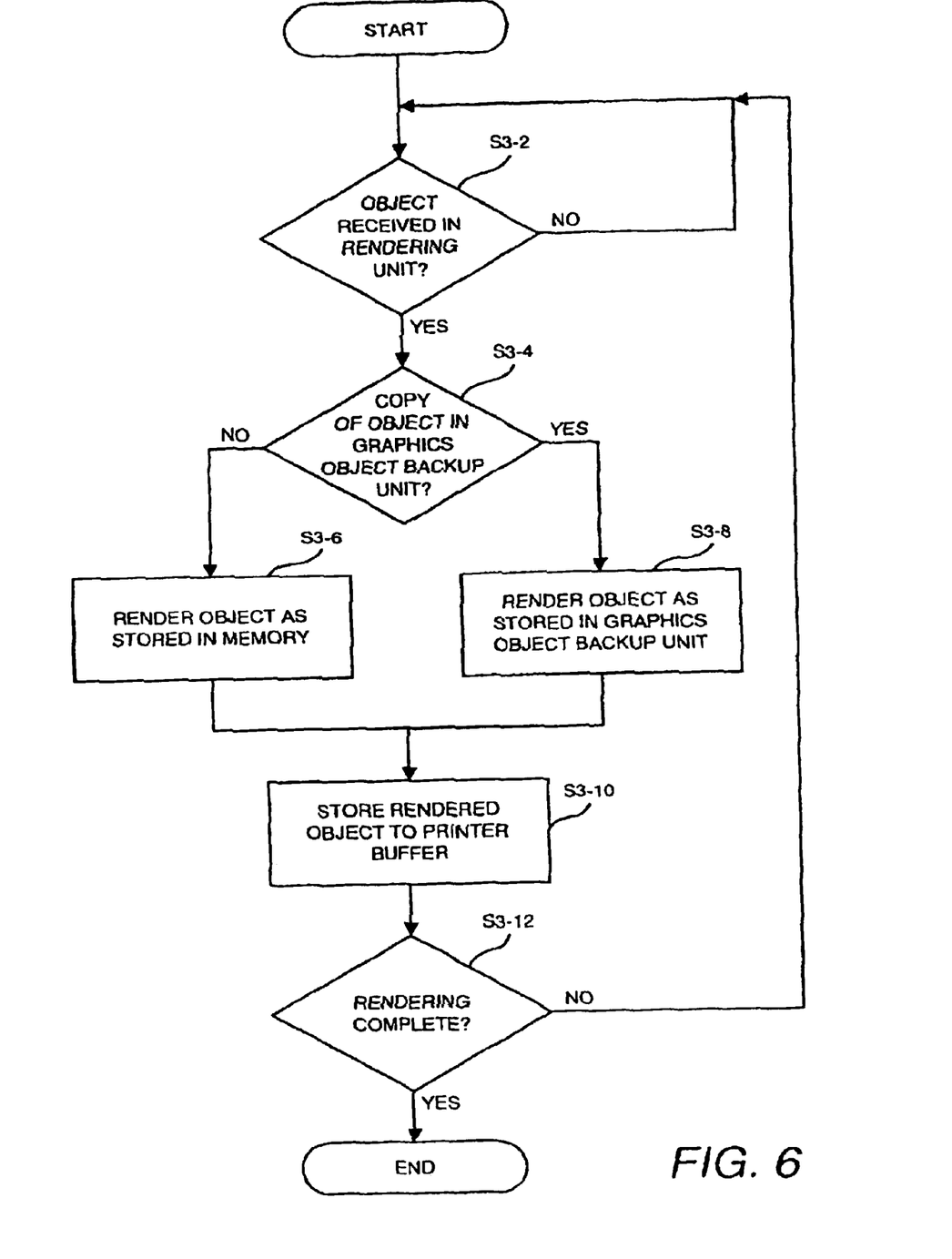
FIG. 6 is a flow diagram illustrating a process performed by a print rendering unit on the graphics console illustrated in FIG. 3.

Then, the received object is checked in step S3-4, to see if a copy thereof has been placed in the graphics object backup unit 262 by the object access monitor 260 or whether data has been stored indicating that the object is to be ignored (because it is a new object created after receipt of the PrintScreen request). If not, then in step S3-6, the object is rendered by the printer rendering unit 264 as originally stored in memory in the graphics object 250. Otherwise, if a copy does exist in the graphics object backup unit 262, the object is rendered in step S3-8, in the form in which it is stored in the graphics object backup unit 262. In this embodiment, the printer rendering unit 264 renders the graphics objects at a higher resolution than the graphics rendering unit 248 in order to provide acceptable printed images.

After the rendering step, whichever is employed, a check is made in step S3-10 to establish if rendering has been completed. If not, then the next object is awaited in step S3-2 as before. Otherwise, the printer rendering unit process is completed.

Referring again to FIG. 4, in step S1-10 the print screen initialiser function unit checks whether the printer rendering unit 264 has completed its rendering process. This step cycles until the print screen initialiser function unit 244 receives a message from the printer rendering unit 264 that it has completed the printer rendering process, as illustrated in FIG. 6.

Once the printer rendering unit 264 has finished its process, the print screen initialiser function unit 244 deallocates the memory for the printer buffer 266, in step S1-12. Thereafter, in step S1-14, the printer rendering unit 264 is deallocated. Then, in step S1-16, the graphics object backup unit 262 is deallocated, and finally, the object access monitor 260 is deallocated in step S1-18. These deallocation steps S1-12 to S1-18 return the computing unit 230 to the condition illustrated in FIG. 2.

Many modifications can be made to the embodiment described above within the scope of the claims.

For example, whereas the specific embodiment described above is described in connection with the processing of one screen shot, it will be appreciated that several instances of the print rendering unit 264 could be initialised by repeated calls to the print screen initialiser function unit 244. The only limitation to this approach would be the processing power of the console and potentially the memory capacity thereof. Should excessive demands be made on the capability of the hardware to multitask, or to store multiple copies of locked objects, the user could be informed that overload has taken place, or the game could be paused momentarily to allow the hardware to handle the exceptionally high demands.

In the illustrated embodiment, after the printscreen function has been initialised, a copy of a graphics object which is to be changed is stored as recovery data in the graphics object backup unit 262 before the change occurs. Alternatively, data could be stored in the graphics object backup unit 262 which enables an unchanged graphics object to be reconstructed from the graphics object as modified. For example, when the change relates to a movement of a dynamic object within the world static geometry, then a matrix could be stored in the graphics object backup unit 262 for transforming the modified transformation matrix of the dynamic object back to the transformation matrix of the dynamic object at the time the printscreen function was initialised.

In the illustrated embodiment, static image data is generated in the form of print data for a printer. Alternatively the static image data could be image data for display on an image display unit, for example a computer screen or a television. Of course, the static image data could be sent to a different computer processing apparatus (for example by e-mail) prior to display.

If a printed image has been produced using the PrintScreen function, first and subsequent generation copies of this printed image can be produced by conventional techniques such as photocopying. If the static image data is stored in electronic format, the static image data could be copied to a storage device, such as a floppy disk or the like. Further, static image data stored in electronic format can be sent electronically using an e-mail system or the like. These copying techniques allow the static image to be distributed to many different people.

The specific embodiment described above is illustrated as being supplied as a module in an original development tool. However, it will be understood that the module could be provided in a separate tool, such as a plug-in to an existing graphics development library.

Whereas the invention has been illustrated by way of an example involving a game console, the apparatus is equally suitable to other applications where hardware may have somewhat limited capabilities. For example, hand held devices, and particularly mobile telephony units could incorporate a module in accordance with the present invention to generate a high quality printed output as a background function, in contrast with graphical output on such a device which is usually of very low resolution. Also, a set top box, such as used by cable television subscribers, could also be used in conjunction with the present invention. A set top box may have similar hardware capabilities to a game console as illustrated in FIG. 1. Alternatively, a conventional computer could be used.

As described, as well as computer apparatus and processes performed in the computer apparatus, the invention also extends to computer programs, particularly computer programs on or in a carrier, adapted for putting the invention into practice. The computer program may correspond to only the printscreen function, a library of functions including the printscreen function, or an application incorporating the printscreen function. The computer program may be in the form of source code, object code, a code intermediate source and object code such as in partially compiled form, or in any other form suitable for use in the implementation of the processes according to the invention.

The carrier may be any entity or device capable of carrying the program. For example, the carrier may comprise a storage medium such as a ROM, for example a CD ROM or a semiconductor ROM, or a magnetic recording medium, for example a floppy disk or hard disk. Further, the carrier may be a transmissible carrier such as an electrical or optical signal which may be conveyed via electrical or optical cable or by radio or other means.

When the program is embodied in a signal which may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes.

What is claimed is:

1. Computer graphics apparatus comprising:
a data store for storing data defining a computer model comprising a plurality of three-dimensional objects;
a model modifier operable to modify the computer model when stored in the data store; and
a dynamic display data generator operable to process the data defining the computer model to generate display data defining a sequence of two-dimensional display images for display to a user conveying the changing computer model,
wherein the computer graphics apparatus further comprises:
a receiver arranged to receive a signal to initiate generation of static image data corresponding to one of the sequence of display images;
a detector operable to detect modification of the computer model subsequent to the reception of an initiation signal;
a recovery data writer responsive to said detector and operable to write recovery data to a memory enabling the computer model corresponding to the display image on receipt of the initiation signal to be generated using the computer model as modified subsequent to the reception of the initiation signal; and
a static image data generator operable to generate static image data corresponding to the display image on receipt of the initiation signal using the computer model as modified subsequent to the reception of the initiation signal and the recovery data written by the recovery data writer.

2. Computer graphics apparatus according to claim 1, wherein the computer model comprises a plurality of data objects, each data object having associated therewith one or more variable data items, and
wherein the recovery data writer is operable, on detection by the detector of a modification to a variable data item, to store a copy of the content of said variable data item before modification as said recovery data.

3. Computer graphics apparatus according to claim 2, wherein the static image data generator is arranged to generate static image data using said recovery data in place of the modified data items.

4. Computer graphics apparatus according to claim 1, wherein the computer model comprises a plurality of data objects, each data object having associated therewith one or more variable data items, and
wherein the recovery data writer is operable, on detection by the detector of a modification to a variable data item, to generate and store recovery data comprising change data associated with the difference between the content of said variable data item before said modification and the content of said variable data item after modification.

5. Computer graphics apparatus according to claim 1, wherein the computer model comprises a plurality of data objects,
wherein said model modifier comprises a plurality of instruction generators, each instruction generator being operable to generate a lock instruction specifying a data object to be modified to prevent other instruction generators from modifying the specified data object, and
wherein said detector is arranged to detect a lock instruction.

6. Computer graphics apparatus according to claim 1, wherein the initiation signal defines a user selection of a display image and wherein the static image data generator comprises a print data generator operable to generate print data for a printer.

7. Computer graphics apparatus according to claim 1, wherein the dynamic display data generator is arranged to generate display data at a first resolution and the static image data generator is arranged to generate static image data at a second resolution greater than the first resolution.

8. A method of processing data defining a computer model of a plurality of three-dimensional objects to generate display data defining a sequence of changing two-dimensional images and static image data corresponding to a selected one of the sequence of display images, the method comprising:
modifying the computer model;
processing the data defining the computer model to generate display data defining a sequence of two-dimensional display images for display to a user conveying the changing computer model;
receiving a signal initiating generation of static image data corresponding to one of the sequence of display images;
detecting modification of the computer model subsequent to reception of the initiation signal;
in response to detection of a modification, storing recovery data enabling the computer model corresponding to the display image on receipt of the initiation signal to be generated using the computer model as modified subsequent to receipt of the initiation signal; and
generating static image data corresponding to the display image on receipt of the initiation signal using the computer model as modified subsequent to receipt of the initiation signal and the recovery data.

9. A method according to claim 8, wherein the computer model comprises a plurality of data objects, each data object having associated therewith one or more variable data items,
wherein the detection of modification of the computer model comprises detecting modification to a variable data item, and
wherein the storage of recovery data comprises, on detection of a modification to a variable data item, storing a copy of the content of said variable data item before modification as said recovery data.

10. A method according to claim 9, wherein the generation of static image data comprises generating static image data using said recovery data in place of the modified data items.

11. A method according to claim 8, wherein the computer model comprises a plurality of data objects, each data object having associated therewith one or more variable data items,
wherein the detection of modification of the computer model comprises detecting a modification to a variable data item, and
wherein the storage of recovery data comprises, on detection of a modification to a variable data item, generating and storing recovery data comprising change data associated with the difference between the content of said variable data item before modification and the content of said variable data item after modification.

12. A method according to claim 8, wherein the computer model comprises a plurality of data objects,
wherein, in the modification of the computer model, one of a plurality of instruction generators generates a lock instruction specifying a data object to be changed to prevent other instruction generators from varying the specified data object, and wherein the detection of modification of the computer model comprises detecting a lock instruction.

13. A method according to claim 8, wherein the initiation signal defines a user selection of a display image and wherein the static image generation comprises generating print data for a printer.

14. A method according to claim 13, further comprising printing an image in accordance with said print data.

15. A method according to claim 14, further comprising copying the printed image, either directly or indirectly, to generate a copy image.

16. A method according to claim 8, wherein the display data generation generates display data at a first resolution and the static image data generation generates static image data at a second resolution greater than the first resolution.

17. A storage device storing instructions including instructions for causing a programmable processing apparatus to become operable to perform processing to:

receive a signal to initiate generation of static image data corresponding to one of a sequence of display images generated by processing data defining a changing computer model comprising a plurality of three-dimensional objects;

detect modification of the computer model subsequent to reception of the initiation signal;

in response to detection of a modification, store recovery data enabling the computer model corresponding to the display image on receipt of the initiation signal to be generated using the computer model as modified subsequent to receipt of the initiation signal; and generate static image data corresponding to the display image on receipt of the initiation signal using the computer model as modified subsequent to receipt of the initiation signal and the recovery data.

18. A storage device according to claim 17, wherein the computer model comprises a plurality of data objects, each data object having associated therewith one or more variable data items, and wherein the instructions comprise instructions for causing the programmable processing apparatus to perform processing so that:

the detection of modification of the computer model comprises detecting a modification to a variable data item, and the storage of recovery data comprises, on detection of a modification to a variable data item, storing a copy of the content of said variable data item before modification as said recovery data.

19. A storage device according to claim 18, wherein the instructions comprise instructions for causing the programmable processing apparatus to perform processing so that:

the generation of static image data comprises generating static image data using said recovery data in place of the modified data items.

20. A storage device according to claim 17, wherein the computer model comprises a plurality of data objects, each data object having associated therewith one or more variable data items, and wherein the instructions comprise instructions for causing the programmable processing apparatus to perform processing so that:

the detection of modification of the computer model comprises detecting a modification to a variable data item, and the storage of recovery data comprises, on detection of a modification to a variable data item, generating and storing recovery data comprising change data associated with the difference between the content of said variable data item before modification and the content of said variable data item after modification.

21. A storage device according to claim 17, wherein the computer model comprises a plurality of data objects which are modified by a plurality of instruction generators, each instruction generator commencing a modification by generating a lock instruction specifying a data object to be changed to prevent other instruction generators from varying the specified data object, and the instructions comprise instructions for causing the programmable processing apparatus to perform processing so that:

the detection of modification of the computer model comprises detecting a lock instruction.

22. A storage device according to claim 17, wherein the initiation signal defines a user selection of a display image and wherein the instructions comprise instructions for causing the programmable processing apparatus to perform processing so that:

the generation of the static image data comprises generating print data for a printer.

23. A storage device according to claim 17, wherein the initiation signal defines a user selection of a display image and wherein the instructions comprise instructions for causing the programmable processing apparatus to perform processing so that the display data generation generates display data at a first resolution and the static image data generation generates static image data at a second resolution greater than the first resolution.

24. A physically-embodied computer program product including instructions in computer-readable form, including instructions for causing a programable processing apparatus to become operable to perform processing to:

receive a signal to initiate generation of static image data corresponding to one of a sequence of display images generated by processing data defining a changing computer model comprising a plurality of three-dimensional objects;

detect modification of the computer model subsequent to reception of the initiation signal;

in response to detection of a modification, store recovery data enabling the computer model corresponding to the display image on receipt of the initiation signal to be generated using the computer model as modified subsequent to receipt of the initiation signal; and generate static image data corresponding to the display image on receipt of the initiation signal using the computer model as modified subsequent to receipt of the initiation signal and the recovery data.

25. A physically-embodied computer program product according to claim 24, wherein the computer model comprises a plurality of data objects, each data object having associated therewith one or more variable data items, and wherein the instructions comprise instructions for causing the programmable processing apparatus to perform processing so that:

the detection of modification of the computer model comprises detecting a modification to a variable data item, and the storage of recovery data comprises, on detection of a modification to a variable data item, storing a copy of the content of said variable data item before modification as said recovery data.

26. A physically-embodied computer program product according to claim 25, wherein the instructions comprise instructions for causing the programmable processing apparatus to perform processing so that:

the generation of static image data comprises generating static image data using said recovery data in place of the modified data items.

27. A physically-embodied computer program product according to claim 24, wherein the computer model comprises a plurality of data objects, each data object having associated therewith one or more variable data items, and wherein the instructions comprise instructions for causing the programmable processing apparatus to perform processing so that:

the detection of modification of the computer model comprises detecting a modification to a variable data item, and the storage of recovery data comprises, on detection of a modification to a variable data item, generating and storing recovery data comprising change data associated with the difference between the content of said variable data item before modification and the content of said variable data item after modification.

28. A physically-embodied computer program product according to claim 24, wherein the computer model comprises a plurality of data objects which are modified by a plurality of instruction generators, each instruction generator commencing a modification by generating a lock instruction specifying a data object to be changed to prevent other instruction generators from varying the specified data object, and the instructions comprise instructions for causing the programmable processing apparatus to perform processing so that:

the detection of modification of the computer model comprises detecting a lock instruction.

29. A physically-embodied computer program product according to claim 24, wherein the initiation signal defines a user selection of a display image and wherein the instructions comprise instructions for causing the programmable processing apparatus to perform processing so that:

the generation of the static image data comprises generating print data for a printer.

30. A physically-embodied computer program product according to claim 24, wherein the initiation signal defines a user selection of a display image and wherein the instructions comprise instructions for causing the programmable processing apparatus to perform processing so that the display data generation generates display data at a first resolution and the static image data generation generates static image data at a second resolution greater than the first resolution.

31. Computer graphics apparatus comprising:

a data store for storing data defining a computer model comprising a plurality of three-dimensional objects;

means for modifying the computer model when stored in the data store; and means for processing the data defining the computer model to generate display data defining a sequence of two-dimensional display images for display to a user conveying the changing computer model, wherein the computer graphics apparatus further comprises:

means for receiving a signal to initiate generation of static image data corresponding to one of the sequence of display images;

means for detecting modification of the computer model subsequent to the reception of an initiation signal;

recovery means responsive to said detector and operable to write recovery data to a memory enabling the computer model corresponding to the display image on receipt of the initiation signal to be generated using the computer model as modified subsequent to the reception of the initiation signal; and static image data generation means for generating static image data corresponding to the display image on receipt of the initiation signal using the computer model as modified subsequent to the reception of the initiation signal and the recovery data written by the recovery means.

* * * * *

UNITED STATES PATENT AND TRADEMARK OFFICE
CERTIFICATE OF CORRECTION

PATENT NO. : 6,867,767 B2
DATED : March 15, 2005
INVENTOR(S) : Simon David Meldrum et al.

It is certified that error appears in the above-identified patent and that said Letters Patent is hereby corrected as shown below:

<u>Title page,</u>
Item [56], References Cited, U.S. PATENT DOCUMENTS,
"50,988 A *   11/1865      Petrov et al." should read
-- 2002/0050988 A1   5/2002    Petrov et al. --.

Signed and Sealed this

Twenty-eighth Day of March, 2006

JON W. DUDAS
*Director of the United States Patent and Trademark Office*